(No Model.) 2 Sheets—Sheet 2.
A. S. VOGT.
PIPE COUPLING.
No. 491,299. Patented Feb. 7, 1893.
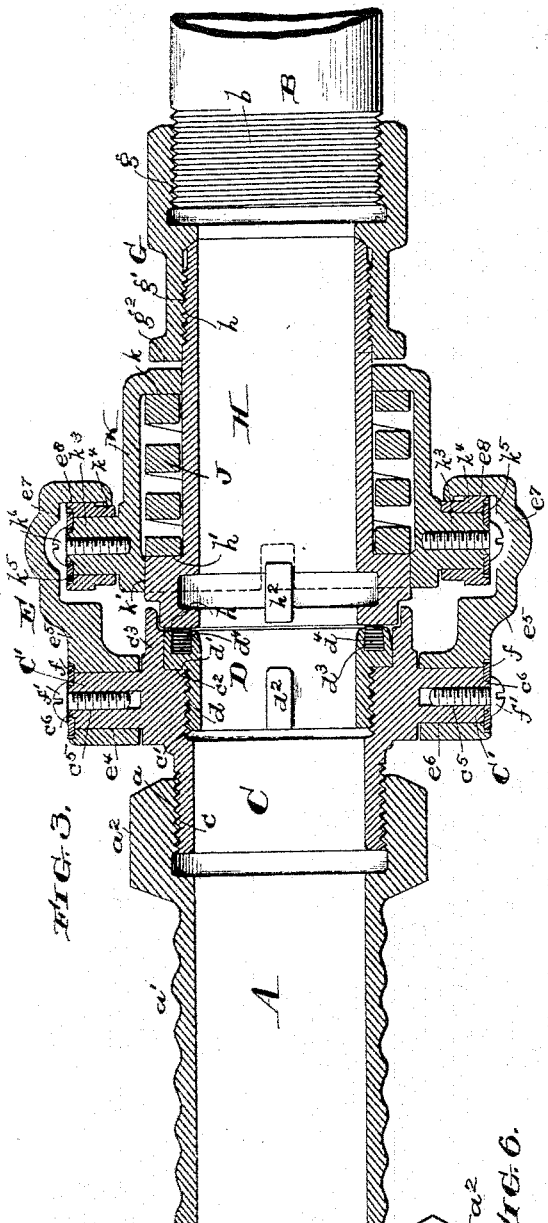
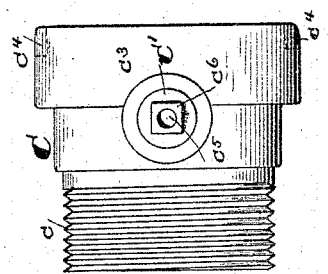
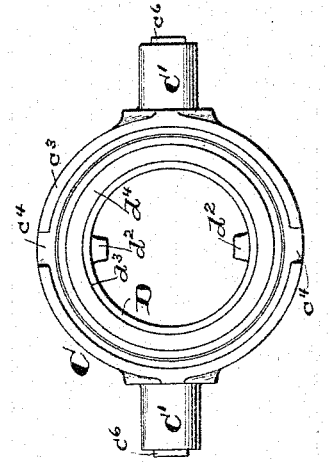
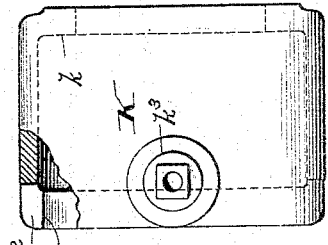
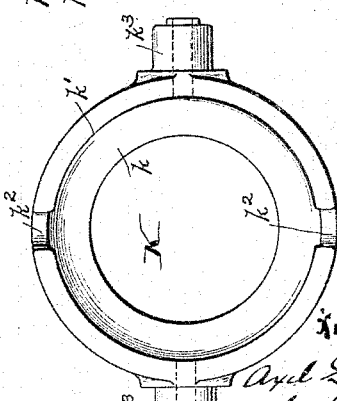
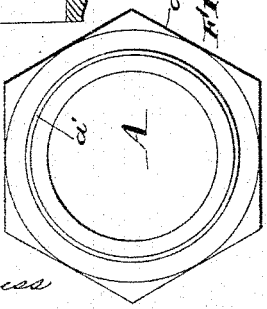
Witnesses:
Inventor:
Axel S. Vogt
by his atty.

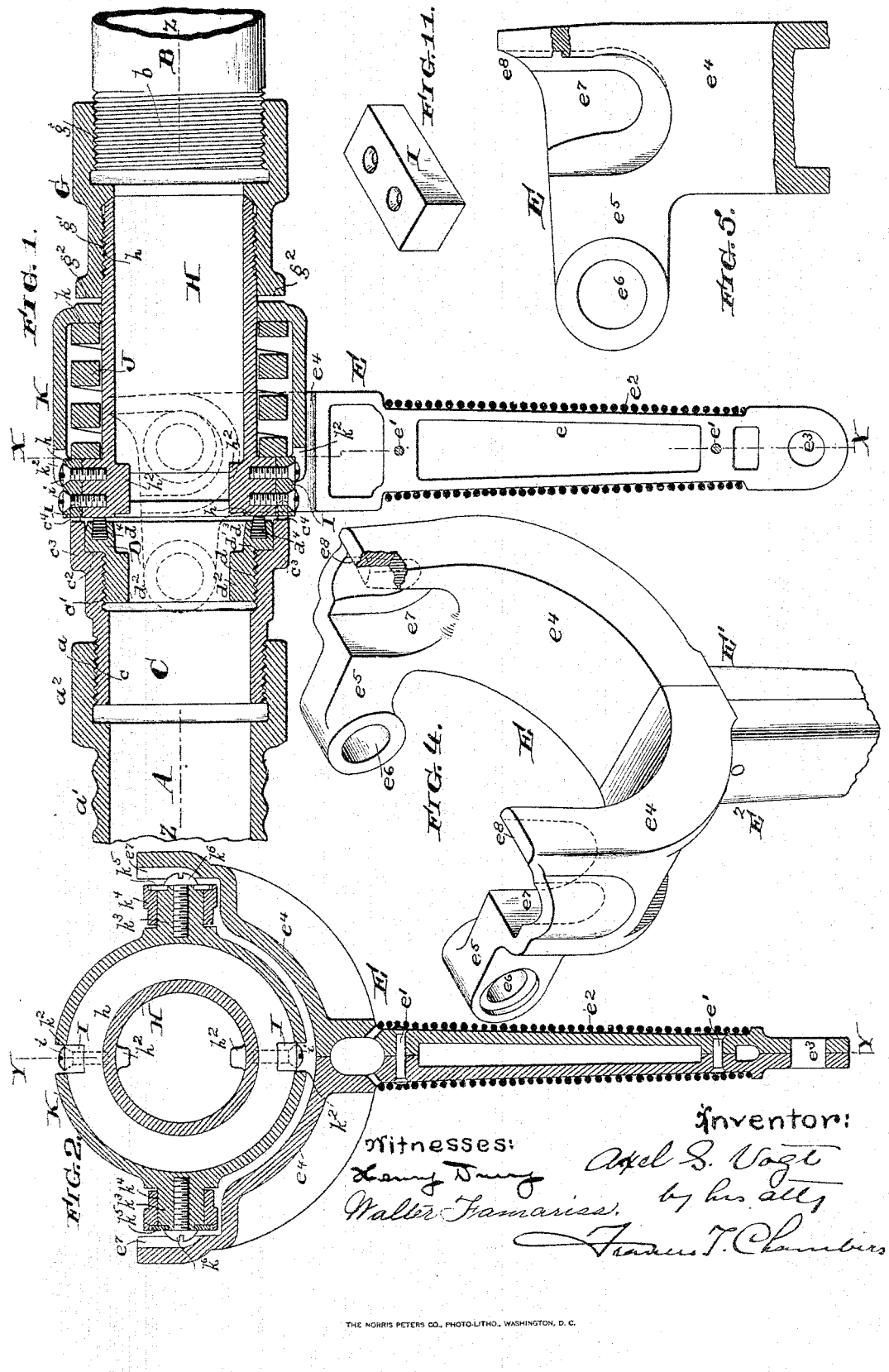

UNITED STATES PATENT OFFICE.

AXEL S. VOGT, OF ALTOONA, PENNSYLVANIA.

PIPE-COUPLING.

SPECIFICATION forming part of Letters Patent No. 491,299, dated February 7, 1893.

Application filed November 26, 1892. Serial No. 453,258. (No model.)

*To all whom it may concern:*

Be it known that I, AXEL S. VOGT, a subject of the King of Sweden and Norway, and a resident of Altoona, county of Blair, State of Pennsylvania, have invented a certain new and useful Improved Pipe-Coupling, of which the following is a true and exact description, reference being had to the accompanying drawings, which form a part of this specfication.

My invention relates to pipe couplings and is especially designed for use in coupling together pipes used in railroad cars for the transmission of steam from the engine to the train.

My object is to provide a coupling at once simple, efficient, and readily operated.

The nature and construction of my device will be best understood as described in connection with the drawings in which it is illustrated and the novel features which I desire to protect by Letters Patent are hereinafter pointed out in the claims.

In the drawings:—Figure 1 is a longitudinal section through my improved coupling taken on the line $y\, y$ of Fig. 2. Fig. 2 is a cross-section taken on the line $x\, x$ of Fig. 1. Fig. 3 is a longitudinal section taken on the line $z\, z$ of Fig. 1. Fig. 4 is a perspective view of the peculiar lever which forms an important feature of my device. Fig. 5 is a view showing the construction of a portion of this lever. Fig. 6 is an end view of the pipe section marked A in the drawings. Fig. 7 is an end view of the sleeve marked K in the drawings viewed from the front. Fig. 8 is a side elevation of the said sleeve partially broken away to show a detail of its construction. Fig. 9 is an end view of the pipe section marked C in the drawings. Fig. 10 a side elevation of the same pipe section; and Fig. 11 a perspective view of a guide block used to preserve the proper alignment of the two opposite parts of the coupling for putting them together.

A is a pipe section which as shown is provided with an internal thread $a$ and with a roughened or corrugated extension $a'$ and to which a rubber hose (not shown in the drawings) is conveniently attached.

B represents the end of the pipe to which the coupling device is attached; it is externally threaded at $b$.

C is a pipe section externally threaded at $c$ so as to screw into the section A and internally threaded at $c'$; having also a shoulder $c^2$ formed at its end and a projecting flange $c^3$ extending beyond said shoulder and provided with a notch $c^4$; on the outside of this pipe section are formed or secured projections or trunnions C' and as shown a threaded perforation $c^5$ is formed in the center of this trunnion and a square projection $c^6$ formed around the same.

D is a packing holder ring externally threaded at $d$ so as to screw into the threaded end $c'$ of the pipe section C and having a projecting shoulder $d'$ which rests against the shoulder $c^2$ of the pipe section. A cavity $d^3$ is formed in the end of this ring to contain the packing $d^4$ and projections $d^2$ are conveniently formed on it to afford a hold in screwing it into or out of the pipe section C.

E is a coupling lever which, as shown, is formed in two parts, E' E², for convenience in applying it to the trunnions on which it turns. The handle $e\, e$ of this lever is secured together by rivets as $e'$ or a wrapping, $e^2$, or both of them. From the base of the handle extend arms $e^4\, e^4$ formed to straddle the pipe section C; and from the end of these arms extend arms $e^5\, e^5$ in the ends of which are formed bearings $e^6$ which fit on the trunnions C' and as shown are secured by a washer $f$ fitting around the square projection $c^6$ and held in place by a screw $f'$ fitting in the perforation $c^5$. Grooves or notches $e^7\, e^7$ are formed in the arms $e^4$ with their outer faces $e^8$ flared slightly for the purpose hereinafter described. At the end of the handle portion I have shown a perforation $e^3$ through which a cord can be passed to prevent the lever and the appliances to which it is attached falling too low and to aid in operating it if desired.

G is a sleeve internally threaded at $g$ and $g'$ so as to unite together the end of pipe B and the pipe section H. This pipe section H is formed with an outwardly-extending shoulder or flange $h$ and its front end, $h'$, is shaped so as to fit inside of the flange $c^3$ and abut against the packing ring $d^4$.

J is a spiral spring surrounding the pipe section H and abutting against its shoulder $h$.

K is a sleeve fitting around the spring J and having at its rear a downwardly-extending flange $k$ which rests against the back end of the spring J, while its front end, $k'$, is conveniently made to fit neatly on the periphery of the projection $h$ and with slots $k^2 k^2$ corresponding to the slots $c^4 c^4$ in the pipe section C. On the outside of this sleeve are formed or secured projections or trunnions $k^3$ and as shown an anti-friction ring $k^4$ is fastened on the trunnions $k^3$ by means of a washer $k^5$ and screw $k^6$.

I I are guide blocks which are fastened on the outside of the pipe section H by means of screws $i$ $i$. This guide block extends up and into the slots $k^2$ of the sleeve K so as to hold the said sleeve in position and prevent it turning; and they also fit into the notches $c^4$ at the end of the pipe section C when that section is abutted against the pipe section H in making a coupling. In this way the proper alignment of the projections or trunnions on the two pipe sections is insured. The device is simple but of course subject to indefinite modification as any aligning device could be used in its stead.

The operation of the device is easily followed: The parts being put together as above described and as shown in the drawings; when it is desired to make a coupling the pipe sections C and H are abutted against each other in such a way that the trunnions on the section C and sleeve K will lie in the same plane;—the operator then takes hold of the handle of the lever E and turns it outwardly;—the notches $e^7$ then engage the trunnions or projections $k^3$ on the sleeve K and owing to the inclined form of the faces $e^8$ as the lever presses down it draws the sleeve K inward toward the pipe section C compressing the spring J and through it pressing the pipe section H against the packing ring in the end of the section C; and when the operation is completed the form of the grooves $e^7$ is such as to hold the two pipe sections together thus effecting readily a tight joint between the two pipe sections. The plan shown by which the lever E is permanently pivoted to the trunnions C' is the one preferred by me but it is of course obvious that the lever could be pivoted on the trunnions $k^3$ of sleeve K and the grooves $e^7$ made to engage the projections C'.

Having now described my invention, what I claim as new and desire to secure by Letters Patent, is:

1. In a pipe coupling the combination of a pipe section C having lugs or projections C'; a pipe section H having a shoulder $h$; a spring J abutting against said shoulder; a sleeve K formed to inclose the spring and having a flange $k$ adapted to extend down and engage the back end thereof; and trunnions or projections $k^3$ corresponding to those on section C; and a lever E having bearings $e^6$ by which it is pivoted to one pair of trunnions, and recesses $e^7$ formed to engage the other pair when pushed down, all substantially as and for the purpose specified.

2. In a pipe coupling the combination of a pipe section C having lugs or projections C'; a pipe section H having a shoulder $h$; a spring J abutting against said shoulder; a sleeve K formed to inclose the spring and having a flange $k$ adapted to extend down and engage the back end thereof; and trunnions or projections $k^3$ corresponding to those on section C; a lever E having journals $e^6$ by which it is pivoted to one pair of trunnions and recesses $e^7$ formed to engage the other pair when pushed down; and a guide as I arranged to engage the sleeve K and section C together in correct alignment, all substantially as and for the purpose specified.

3. In a pipe coupling, the combination of a pipe section C having trunnions or projections C'; and projecting flange $c^3$; a packing holder D secured in the end of section C inside its flange $c^3$; a pipe section H having its end $h'$ formed to fit in the flange $c^3$ of section C; and a shoulder $h$ formed on its outer surface; a spring J abutting against the shoulder $h$; a sleeve K surrounding spring J and having a flange $k$ extending down to engage the rear end of said spring; and trunnions or projections $k^3$ corresponding with those on the section C; a guide as I. secured to the end of section H and arranged to engage the ends of the sleeve K and pipe section C and hold them in correct alignment; and a lever E journaled on the trunnions C' and having recesses $e^7$ with flaring edges $e^8$ formed to engage the projections $k^3$ and clamp the two parts of the coupling together.

A. S. VOGT.

Witnesses:
 ALF. H. FABER,
 D. STEWART.